United States Patent [19]
Quinto
[11] Patent Number: 4,934,896
[45] Date of Patent: Jun. 19, 1990

[54] REFUSE COLLECTION APPARATUS AND METHOD

[76] Inventor: De Filippi Quinto, 29 Edenvalley Drive, Islington, Ontario, Canada, M9A 4Z5

[21] Appl. No.: 299,468

[22] Filed: Jan. 23, 1989

[30] Foreign Application Priority Data

Apr. 29, 1988 [CA] Canada .................................. 565608

[51] Int. Cl.$^5$ .......................... B65F 3/02; B65G 67/20

[52] U.S. Cl. .................................... 414/498; 414/408; 414/494; 414/500; 414/786

[58] Field of Search ............... 414/501, 500, 498, 499, 414/491, 345, 346, 494, 786

[56] References Cited

U.S. PATENT DOCUMENTS

| | | | |
|---|---|---|---|
| 3,007,588 | 11/1961 | Cull | 414/498 |
| 3,071,264 | 1/1963 | Totaro et al. | 414/494 |
| 3,202,305 | 8/1965 | Dempster et al. | 414/498 |
| 3,370,525 | 2/1968 | Bowles | 414/498 |
| 3,799,347 | 3/1974 | Weaver | 414/517 |
| 3,841,505 | 10/1974 | Kent | 414/500 |
| 4,096,959 | 6/1978 | Schäffler | 414/408 |
| 4,538,951 | 9/1985 | Yeazel et al. | 414/407 |
| 4,832,561 | 5/1989 | Nijenhuis | 414/500 |

*Primary Examiner*—David H. Brown

[57] ABSTRACT

A refuse collection system having a flat-bed refuse collection vehicle with a releasable container body, and having a refuse loader for loading refuse, a refuse compactor in the container body, a flat-bed container hauling vehicle, and, a container loader on the hauling vehicle for loading and unloading the container, and a refuse container carrying trailer, hauled by the hauling vehicle, the trailer being adapted to carry a refuse container, and a method of collecting refuse using such vehicles and containers.

6 Claims, 4 Drawing Sheets

REFUSE COLLECTION APPARATUS AND METHOD

The invention relates to a front loading refuse vehicle, of the type wherein a refuse receptacle is raised and lowered over the cab of the vehicle, for dumping into the vehicle body, and to a refuse disposal system using such vehicles.

BACKGROUND OF THE INVENTION

Front loading refuse vehicles are used by contractors who employ a number of refuse receptacles, which are placed at various work sites where refuse is collected in them.

At regular intervals the vehicle will visit the site, and engage and lift the receptacle up over the cab of the vehicle. The receptacle is then inverted over the container body of the vehicle and refuse is dumped into the container body through a trap door in the top of the body.

The receptacle is then replaced on the ground. Various different mechanisms have been proposed for lifting and tipping the refuse receptacles. Almost all of them employ two arms which can be extended forwardly of the vehicle. The two arms are adapted to be introduced into two sleeves, one on either side of the receptacle. In this way the receptacle can be raised and tipped by the lifting mechanism or hoist.

Various different hoisting mechanisms have been designed for such refuse vehicles.

For any given vehicle chassis, the weight of the lifting mechanism or hoist is a factor in the pay load which the vehicle can carry. The heavier the hoist, the less the pay load.

Some hoisting mechanisms are more difficult to operate than others, and some hoisting mechanisms are more easily damaged than others.

In addition, the hoists are operated by hydraulic cylinders. The design of the hoist, as well as its weight, may be a factor in determining the size of the hydraulic cylinders required for its operation.

The container body is equipped with a compactor mechanism for compacting the refuse within the body. This too adds to its weight and expense.

As a result of these factors, the front loading type of refuse vehicles are relatively expensive, and are suitable generally only for short hauls to a dump site. The vehicles carry a relatively substantial weight both in the hoisting mechanism and in the container body, and are therefore relatively inefficient for longer hauls, if dump sites are at any great distance.

As is well known, dump sites close to cities are rapidly being filled up and closed. Refuse is now being hauled, in some cases, hundreds of miles. This will involve the refuse vehicle in a double journey there and back, to dump each container body full of refuse.

Other types of refuse disposal vehicles are also well known, which are not equipped with hoisting mechanisms or compactors. These vehicles are essentially flat-bed vehicles. A large bulk refuse receptacle is carried on the flat-bed of the vehicle. At a refuse collection site, a slide mechanism on the vehicle is operated so as to first of all tilt the receptacle and then slide it off on to the ground at the site.

When such a receptacle is filled up with refuse, the flat-bed vehicle will return and pick it up and carry it away. This is inefficient since there is no attempt to compress or compact refuse.

The tilting mechanism involved is relatively simple. It involves two long slide bars, and two hydraulic cylinders by means of which the slide bars may be tilted upwardly and downwardly. A winch mechanism is provided with a chain or cable. The cable is then attached to the receptacle at the site, and the receptacle is simply dragged up the slide bars on to the bed of the vehicle.

In general terms, the present invention proposes to employ certain of the advantages of eacn of these two different refuse vehicle systems, together with a number of inventive modifications, and preferably, the addition of a trailer.

The front loading refuse vehicles may be used in and around refuse collection areas in cities, for example, and flat-bed refuse hauling vehicles may be used for hauling refuse long distances, preferably coupled with a trailer, to remove the refuse to the dump site.

BRIEF SUMMARY OF THE INVENTION

With a view to achieving these general objectives, the invention comprises a front loading refuse vehicle, in turn, comprising a vehicle defining a cab portion, and a bed portion behind said cab portion, front-loading hoist mechanism for raising refuse over the front of said vehicle, and dumping it over said bed portion, a removable container body carried on said bed portion, and having a top opening for receiving refuse therein, compaction means within said container body, operable to compact and crush refuse therein, hydraulic power means on said vehicle, and coupling means for connecting and disconnecting said hydraulic power means from said compaction means to permit removal of said contairner body, and, releasable means for releasably securing said container body on said bed portion of said vehicle.

More particularly, it is an objective of the invention to provide such a refuse vehicle having the foregoing advantages including slide bar means on said bed portion of said vehicle, tilting means for tilting said slide bar means, drag means on said vehicle, and guide means on said container body engageable with said slide bar means, whereby said container body may be dragged upwardly and slid downwardly on said slide bar means, with the assistance of said drag means.

More particularly, it is an objective of the invention to provide a refuse collection system comprising a flat-bed refuse collection vehicle adapted to carry a refuse container body, and having refuse loading means for loading refuse into said container body, refuse compaction means in said refuse container, a flat-bed refuse hauling vehicle adapted to carry a said refuse container thereon, and container loading means on said hauling vehicle for loading and unloading said refuse container therefrom.

More particularly, it is an objective of the invention to provide a refuse collection system having the foregoing advantages including a refuse container carrying trailer, adapted to be hauled by said hauling vehicle, said trailer being adapted to carry a refuse container, whereby said front-loading refuse vehicle may sequentially fill a plurality of said refuse containers, said containers subsequently being transferred to said refuse hauling vehicle and to said trailer, for transport to and from a dump site.

More particularly, it is an objective of the invention to provide a refuse collection system having the foregoing advantages wherein said front-loading refuse vehicle is provided with receptacle hoist means comprising slide bars mounted on the bed of said vehicle, and cylinder means for raising and lowering said slide bars, and power-operated means for hauling said receptacle up said slide bars.

More particularly, it is an objective of the invention to provide a refuse hauling vehicle having slide bar means, power-operated means for tilting said slide bar means, and power-operated drag means for dragging a container up said slide bar means.

More particularly, it is an objective of the invention to provide a plurality of refuse containers, each being provided with slide means engagable with said slide bar means, and each being provided with refuse compaction means connectable with power-operated means on said refuse collection vehicle, and on said refuse hauling vehicle, whereby said refuse compaction means may be operated when said container is on said refuse collection vehicle, for compacting refuse therein, and, when said container is on said refuse hauling vehicle, said compaction means may be operated to eject refuse therefrom at a dump site.

It is a further and related objective of the invention to provide a method of collecting refuse and comprising the steps of depositing a plurality of refuse receptacles at a plurality of refuse collection sites, sending a refuse collection vehicle having front-loading means and a removable refuse container thereon, to said refuse collection sites, at each said site engaging a said refuse receptacle, raising the same over the front of said vehicle and dumping it into said container, and replacing said refuse receptacle, compacting said refuse within said container at intervals, at a transfer site removing and depositing said container when full of refuse, and collecting a second said container, and placing it into said refuse collection vehicle for further collection.

More particularly, it is an objective of the invention to provide a method of collecting refuse having the foregoing advantages and including the steps of at said transfer site placing a said loaded container onto a refuse hauling vehicle, hauling said container body to a dump site, ejecting the contents thereof at said dump site, and returning said container to said transfer point.

More particularly, it is an objective of the invention to provide a refuse collection system having the foregoing advantages including the further steps of at said transfer point, placing a loaded container onto a refuse hauling vehicle, thereafter transferring said loaded container onto a refuse hauling trailer, thereafter placing a second said loaded container onto said refuse hauling vehicle, connecting said trailer, and hauling both loaded containers to a dump site.

More particularly, it is an objective of the invention to provide a method of collecting refuse having the foregoing advantages and including the further steps of, at said dump site, uncoupling said trailer, ejecting the contents in said container on said hauling vehicle to empty the same, depositing said empty container body on the ground, transferring the loaded container from said trailer to said refuse hauling vehicle, again ejecting the contents to empty said container, again returning to said trailer, transferring said empty container from said refuse hauling vehicle onto said trailer, reloading the other said empty container onto said refuse hauling vehicle, coupling up said trailer, and returning to said transfer point, and depositing said containers at said transfer point.

The various features of novelty which characterize the invention area pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

Figure 1:
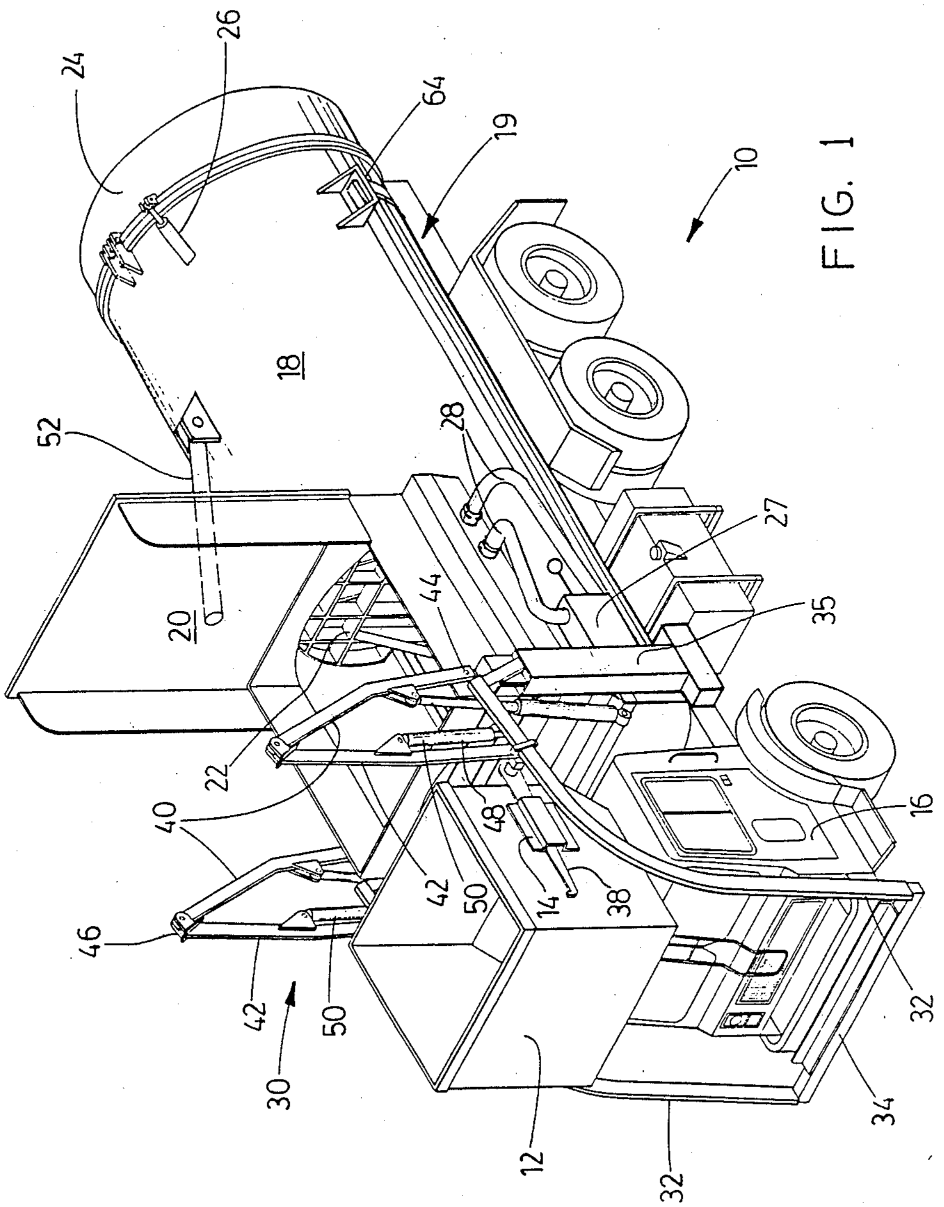
FIG. 1 is a perspective of a front-loading refuse vehicle in accordance with the invention, with parts shown therein in phantom.

Referring first of all to FIG. 1, the invention will be seen to be illustrated with reference to a front loading refuse vehicle of the type adapted to be used with a free standing static refuse receptacle. The refuse vehicle is indicated generally as 10, and the free standing receptacle is indicated generally as 12. Refuse receptacles of this general type are well known in the art, and simply consist of rectangular boxes having an open top with or without a lid. Typically they will be provided with sleeves 14 on either side by means of which they may be picked up, hoisted on top of the refuse collection vehicle and tipped over for dumping the contents.

The refuse vehicle 10 will be seen to have the usual driver's cab 16 at the front end. A refuse container body 18 is removably mounted on the bed 19 of the vehicle.

The container 18 has a trap door indicated generally as 20, on the front end of its top surface through which refuse from the receptacle 12 may be dumped.

Within the container 18 any suitable form of refuse compactor indicated generally as 22 is provided by means of which the refuse may be compacted to increase the pay load and be ejected at the dump site.

At the rear end of the body 18, a swingable rear ejection door 24 operated by a door cylinder 26 is provided through which the contents may be ejected at a dump site. A popular form of container is of generally rectangular shape in section. Another popular form of receptacle body is of generally cylindrical, or oval shape in cross section. Different form of compactor systems may be provided, some of which use multistage telescopic cylinders, others using parallel opposed cylinders, and others using diagonal cylinders for compaction, and a further telescopic cylinder for ejection.

It will be appreciated that the invention is equally applicable to all such systems.

The vehicle 10 has a hydraulic control 27 and the cylinders are supplied with hydraulic fluid through a releasable hydraulic couplings 28, for purposes to be described below.

In accordance with the present invention, the vehicle is what is called a front-loading vehicle, that is to say the receptacles 12 are raised from the front of the vehicle upwardly over the cab and dumped through a trap door in the container 18. This has particular advantages, for example, in working in cities in a confined space. Vehicles of this type are frequently required to operate in narrow laneways, or at building sites where space is restricted. A front-loading type of vehicle has many advantages, particularly from the viewpoint of the operation of the driver who is in the best position for controlling the vehicle at all times.

As mentioned above, various different forms of front-loading mechanisms are in use, all of which involve a relatively complex and heavy mechanism, operated by relatively large capacity cylinders. Such vehicles are provided with hydraulic pumps (not shown), driven usually by the vehicle engine, for operating the cylinders.

In fact, such systems comprise a substantial portion of the load of the vehicle. Consequently, if the vehicle is employed for extended trips to and from dump sites located at great distances from the refuse pickup site, then the substantial investment made in such a mechanism is wasted.

For the purposes of the present invention, one form of hoisting mechanism is described, but the invention, as mentioned above, is not limited to the hoisting mechanism described herein, which is merely shown for exemplary purposes.

Various different forms of containers, compactors and ejection doors may be provided in different designs without departing from the scope of the invention.

In order to raise and tip the receptacles 12, the vehicle 10 in this illustrative embodiment is provided with a front end hoisting mechanism indicated generally as 30.

Mechanism 30 comprises rail means which in this case are provided by a pair of rails 32-32. The rails 32 are located on opposite sides of the front end of the vehicle, and are fastened at their lower ends typically on a cross bar 34 attached to the vehicle frame. The rails 32 extend upwardly, and curve rearwardly over the roof of the cab.

A frame 35 is provided behind the cab to which the rails 32 and to which other mechanisms are attached, for reasons described below.

Movably mounted on the rails 32, are roller carriages 36. The carriages 36 consist of plates and rollers engaging the rails 32.

Swingably mounted on the carriages 36, are lifting arms 38. The arms are shaped and dimensioned so that they may be slid in and out of the sleeves 14 on the refuse receptacle 12 for the purpose of lifting it and tipping it and lowering it once more.

In order to move the carriages 36 along the rails, a two part mechanism is provided comprising hoist arms 40 and hoist linkages 42. The hoist arms are pivotally mounted at 44, in this embodiment to the frame 35.

At their upper ends, the hoist arms 40 are pivotally mounted at 46 to the hoist linkages 42. The hoist linkages are in turn pivotally connected to the carriages 36.

Hoist arm power means consisting of hydraulic cylinders 48, are provided connected more or less midway along the hoist arms 40. The opposite ends of the cylinders are pivotally mounted on frame 35.

Operation of the hydraulic cylinders 48 will cause the hoist arms 40 to swing upwardly and downwardly.

In order to operate the lifting arms, lifting arm power means are provided in the form of hydraulic cylinders 50. Hydraulic cylinders 50 extend midway along the hoist linkages 42, to lifting arms 38.

By the operation of these cylinders, the lifting arms may be swung towards and away from the rails.

In this particular embodiment of the invention, the trap door on top of the container is operated by means of a hydraulic cylinder 52 mounted on the container body.

In operation, the lifting arms and roller carriages will be located at the forward lower ends of the rails. During driving of the vehicle, the lifting arms will be rotated upwardly and rearwardly alongside the rails, thereby permitting free operation of the vehicle.

At the refuse collection site, the vehicle is lined up with the refuse receptacle. The lifting arms 38, by means of the lifting arm cylinders 50, are then rotated forwardly, until they are aligned with the sleeves 14 on the refuse receptacle 12. The vehicle is then driven slowly forward until the lifting arms 38 enter the sleeves 14.

The hoist arm cylinders 48 are then operated to raise the roller carriages up the rails. As the roller carriages move around the curved rails, the lifting arm cylinders 50 are operated so as to maintain the receptacle level.

Once the hoist arms 40 reach the limit of their travel, which is just past the vertical, the lifting arm cylinders are then operated so as to rotate the lifting arms rearwardly thereby tipping the receptacle and dumping its contents within the trap door in the container 18.

The lifting arms are then rotated in the reverse direction, and the hoist arms are then rotated in the reverse direction, thereby lowering the refuse receptacle on the ground. The vehicle then backs away, raises the lifting arms into the driving position and drives away.

At some point in the operation the compactors within the container may be operated so as to compact the refuse.

Figure 2:
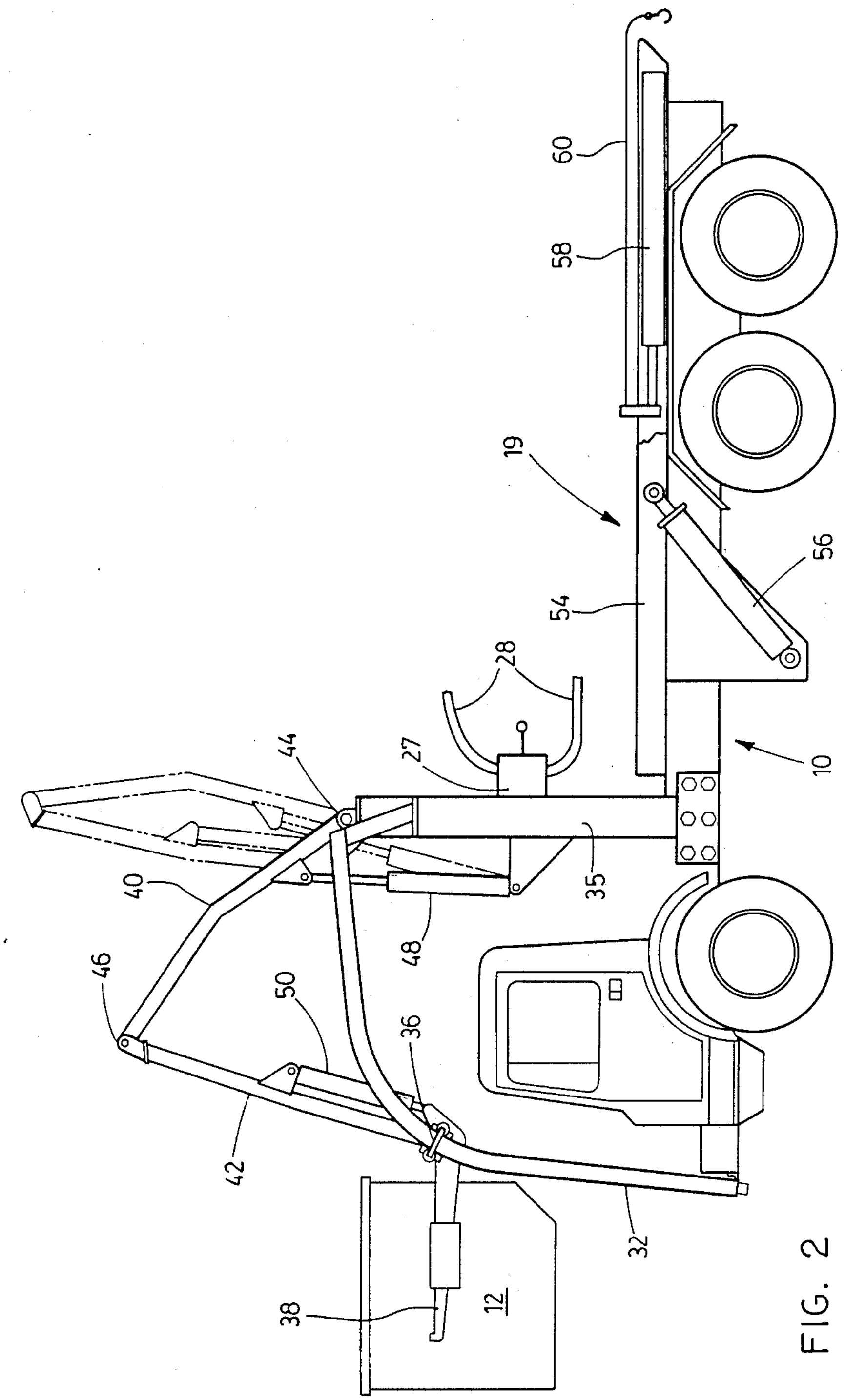
FIG. 2 is a side elevation of the refuse collection vehicle of FIG. 1, shown with the container removed.
Figure 3:
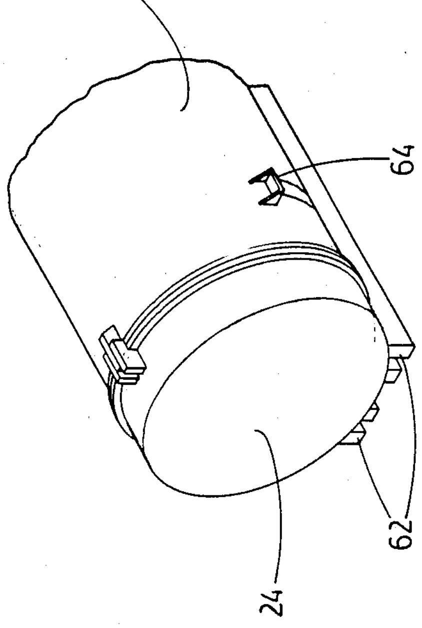
FIG. 3 is a rear perspective illustration of the container of the refuse vehicle of Figs. 1 and 2.

Referring now to FIGS. 2 and 3, the vehicle body rearwardly of the frame 35 will be seen to be what is known simply as a "flat bed", indicated generally as 19.

In this embodiment, it will be seen to be provided with slide means in the form of a pair of slide rails 54-54 which are somewhat longer than the lenght of the flat bed 19. The slide rails 54 are pivotally mounted on the rear of bed 19. The slide rails may be tilted rearwardly by means of tipping cylinders 56, operated by the vehicle's hydraulic system. A drag mechanism 58 is provided in this case mounted on the rails 54 and operated by any suitable means, typically being hydraulic power, provided with a cable and hook 60.

Referring now to FIG. 3, the container will be seen to be provided with slide means in the form of longitudinal slide guides 62-62 on either side, adapted to engage the slide rails 54. Suitable engagement means for engagement by the hook on the cable 60 is provided underneath the container (not shown). When the container is lying on the ground, and it is desired to haul the container up onto the bed of the vehicle, the cylinders are operated to tilt the slide rails 54, until they are close to the ground. At this point the vehicle is then backed up close to the container. The hook and cable are then attached to the container body and the drag 58 is operated. The container is gradually hauled up the slide rails. At a suitable point in the operation, the cylinders 56 are operated so as to return the slide rails to the horizontal, and the container is dragged the remaining distance along the slide rails.

Fastening means such as locks 64 are provided for securing the container in position, so that the vehicle may be driven.

When the container is full, the reverse procedure can be carried out. In some cases, the drag 58 may or may not be used depending upon circumstances, and the experience of the driver.

At this point, it will be seen that the invention provides a front-loading refuse collection vehicle with a removable container, by means of which the container when full can be dropped off, and an empty container can be reloaded on the vehicle for further use.

Figure 4:
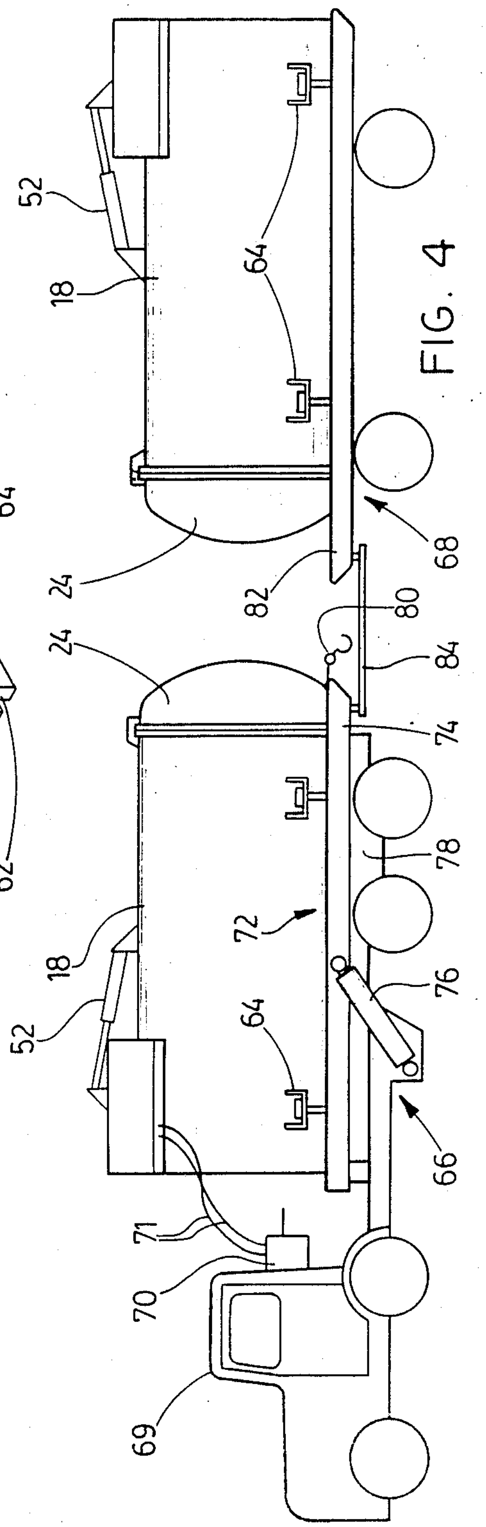
FIG. 4 is a side elevational shematic view showing a refuse hauling vehicle, and a refuse hauling trailer, shown loaded with two containers, and, FIG. 5 is a schematic view showing the method of operation for refuse collection, the transfer point, and the transit to and from the dump site.

In order to take full advantage of the invention, further vehicles are provided as illustrated in connection with FIGS. 4 and 5.

These vehicles are typically designed for extended highway driving, but without the facility for front-end loading.

These vehicles comprise in the first place a refuse hauling vehicle 66, and an optional refuse hauling trailer 68.

The hauling vehicle 66 will comprise a vehicle having a typical front-end consisting of a cab 69. The vehicle 66 has a hydraulic control 70 and releaseable hydraulic couplings 71. The rear of the vehicle is in the form of a flat-bed 72. On the flat-bed 72 there is provided a slide rail means similar to that described above in connection with FIG. 2. It will comprise a pair of slide rails 74, on opposite sides, only one being illustrated. Cylinders 76, and a drag mechanism 78, with a cable and hook 80, are also provided similar to that show in FIG. 2.

It will be operated in essentially the same way to drag containers up and lower them down.

In this preferred embodiment, vehicle 66 is equipped for towing.

The refuse hauling trailer 68 will simply comprise a trailer having a flat-bed and having a pair of slide rails 82, fastened thereto. The slide rails 82 are not intended to tip or tilt, and there is no hydraulic mechanism nor cylinders, nor drag, provided on the trailer.

The trailer is provided with a typical towing bar 84.

Figure 5:
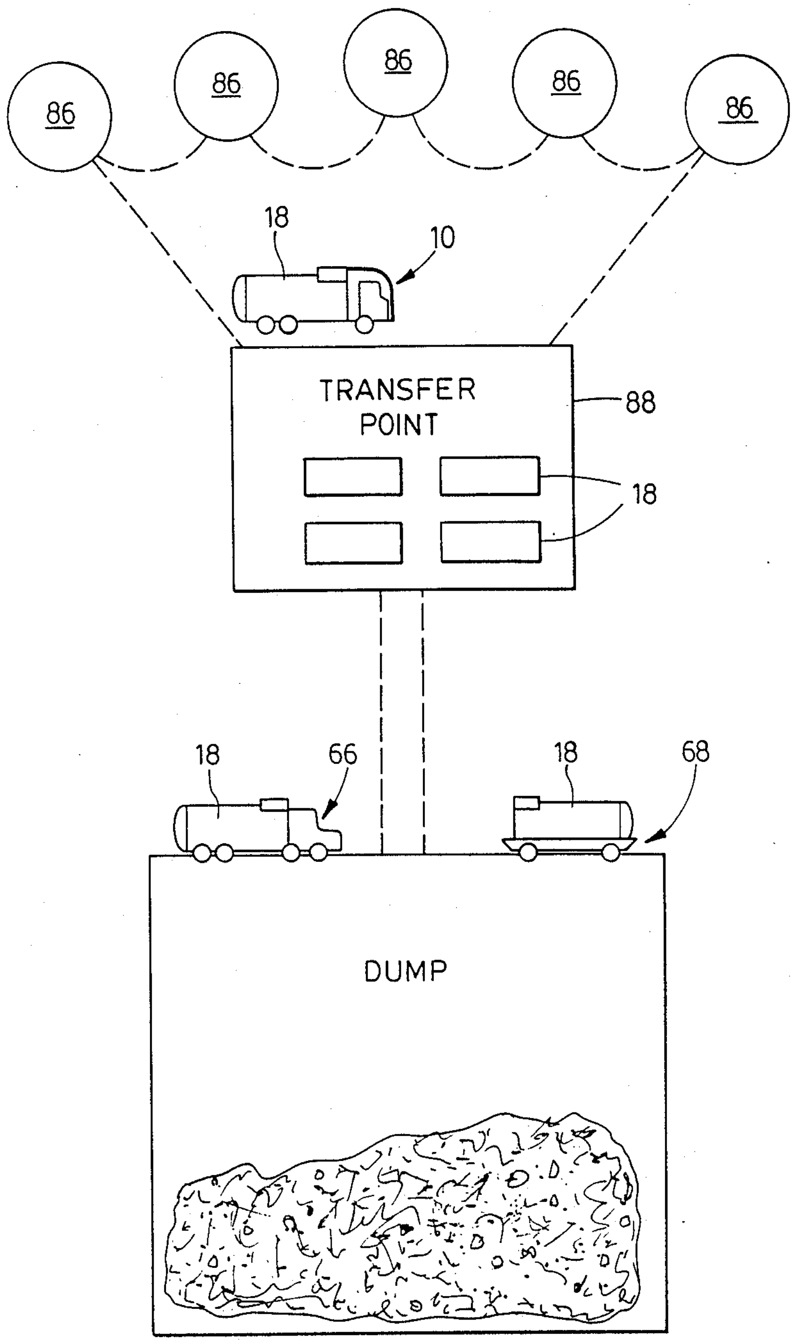

The operation of the entire system will proceed as illustrated in FIG. 5.

The refuse collection vehicle 10, or a fleet of such vehicles in most cases, will operate between the various refuse collection sites indicated as 86, and a central transfer point 88. The refuse receptacles 12 will be located at the various refuse collection sites 86. The vehicle (or vehicles) 10 will simply drive from the transfer point to the collection sites one after the other, collecting refuse until its container is filled. Each vehicle as it fills its container will then return to the transfer site, and will then either deposit its filled container on the ground, or alternatively will deposit its filled container on a trailer 68.

This operation will be achieved by simply backing up the refuse vehicle 10 to the rear end of the trailer. The slide bars and cylinders are then operated so as to cause the container 18 to slide part-way down the slide bars. The slide bars are then lowered to the horizontal position once more, and the collection vehicle is then backed up closer to the trailer, causing the slide guides on the container 18 to engage the slide rails on the trailer 68.

The tipping mechanism on the collection body is then operated once more, and the container will simply slide directly from the collection vehicle on to the trailer. It will be noted at this point that the ejection door 24 is located on the forward end of the trailer.

In order to load a second container on to the vehicle 66, the container will of course first be placed on the ground from its collection vehicle.

It will then be reloaded by the mechanism on the hauling vehicle 66 in the conventional manner, i.e., by dragging it up the slide bars with the drag.

This will then result in the container facing forwardly, with its ejection door facing rearwardly.

The hauling vehicle will then hook up the trailer, and will haul the two containers to a dump site which may be located at a great distance from the transfer point.

At this point, since the ground at the dump site may be soft, the trailer is unhitched on level ground. The vehicle will then drive to the appropriate point on the dump, and having first of all hooked up its hydraulic system to the hydraulic system of the container, will then operate the ejection door so as to open it, and will then operate the compacting system within the container so as to eject the contents.

When this is completed the vehicle 66 will then return to the trailer 68. The driver of vehicle 66 will then disconnect the hydraulics and place its empty container on the ground, and it will then back up to the rear end of the trailer. The full container will then be simply hauled onto the flat-bed of the hauling vehicle. Note that at this point the ejection door is now at the rear of vehicle 66. The vehicle will then again drive to the appropriate place on the dump site, and eject the contents.

The vehicle will then return to the trailer and transfer the empty container back on to the trailer.

It will then pick up the empty container lying on the ground and drag it back up onto its own flat-bed. It will then hook up the trailer and return to the transfer point.

It will thus be seen that the entire procedure of collecting and compacting refuse from various refuse collection points, and bringing it to a central transfer point can be carried out by the more elaborate and expensive refuse collection vehicles. From the transfer sites, the compacted refuse is then hauled in a speedy, effective, and economical manner to the dump site which may be located at some distance by means of the less expensive refuse hauling vehicle, and trailers.

The end result is a much more efficient method of collecting and disposing of refuse, and a more efficient use of time and equipment, than was hitherto possible.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A refuse collection system comprising:

a refuse collection vehicle adapted to carry a releasable refuse container body, and having refuse loading means for loading refuse into said refuse container body;

refuse compaction means in said refuse container body;

a refuse container body hauling vehicle, adapted to carry a said refuse container body thereon;

refuse container body loading means on said hauling vehicle for loading and unloading said refuse container body therefrom and, a refuse container body carrying trailer, adapted to be hauled by said hauling vehicle, said trailer being adapted to carry a refuse container body, whereby said refuse collection vehicle may sequentially fill a plurality of said refuse container bodies, said container bodies subsequently being transferred to said refuse container body hauling vehicle and to said trailer, for transport to and from a dump site.

2. A refuse collection system as claimed in claim 1 wherein said refuse collection vehicle is provided with refuse container body loading means comprising slide bars mounted on the bed of said vehicle, and power means for raising and lowering said slide bars, and power-operated means for dragging a said refuse container body up said slide bars.

3. A refuse collection system as claimed in claim 2 and wherein said refuse container body hauling vehicle has slide bar means, power-operated means for tilting said slide bar means, and power-operated means for dragging a refuse container body up said slide bar means.

4. A refuse collection system as claimed in claim 2 including a plurality of refuse container bodies, each being provided with slide means engagable with said slide bar means, and each being provided with refuse compaction means connectable with power-operated means on said refuse collection vehicle, and on said refuse hauling vehicle, whereby said refuse compaction means may be operated when said refuse container body is on said refuse collection vehicle, for compacting refuse therein, and, when said refuse container body is on said refuse hauling vehicle, said compacting means may be operated to eject refuse therefrom at a dump site.

5. A method of collecting refuse and comprising the steps of:

depositing a plurality of refuse receptacles at a plurality of refuse collection sites;

sending a refuse collection vehicle having front-loading means and a removable refuse container body thereon said refuse container body including refuse compaction mechanism, to said refuse collection sites;

at each said site engaging said refuse receptacle, raising the same over the front of said vehicle and dumping it into said refuse container body, and replacing said refuse receptacle;

compacting said refuse within said refuse container body;

at a transfer site removing and depositing said refuse container body when full of refuse, onto a refuse hauling vehicle;

collecting a second said refuse container body;

dragging it onto said refuse collection vehicle for further collection;

returning to said transfer site, and depositing said second refuse container body on a refuse container body hauling trailer;

connecting said trailer to said refuse hauling vehicle, and hauling both said refuse container bodies to a dump site, and, operating said compaction mechanism in said refuse container bodies whereby to eject the contents thereof at said dump site and returning both said refuse container bodies to said transfer point.

6. A method of collecting refuse as claimed in claim 5 and including the further steps of, at said dump site, uncoupling said trailer, operating said compaction mechanism in said refuse container body on said hauling vehicle to empty contents therefrom, depositing said empty refuse container body on the ground, transferring the loaded refuse container body from said trailer to said refuse hauling vehicle, again operating the compaction mechanism within said refuse container body to empty the same, transferring said empty refuse container body from said refuse hauling vehicle onto said trailer, reloading the other said empty refuse container body onto said refuse hauling vehicle, coupling up said trailer, and returning to said transfer point, and depositing said refuse container bodies at said transfer point.

* * * * *